(12) United States Patent
Holzbach et al.

(10) Patent No.: US 6,963,431 B2
(45) Date of Patent: Nov. 8, 2005

(54) RENDERING METHODS FOR FULL PARALLAX AUTOSTEREOSCOPIC DISPLAYS

(75) Inventors: Mark E. Holzbach, Austin, TX (US); David T. Chen, West Somerville, MA (US)

(73) Assignee: Zebra Imaging, Inc., Austin, TX (US)

( * ) Notice: Subject to any disclaimer, the term of this patent is extended or adjusted under 35 U.S.C. 154(b) by 217 days.

(21) Appl. No.: 10/058,710

(22) Filed: Jan. 28, 2002

(65) Prior Publication Data

US 2002/0067521 A1 Jun. 6, 2002

Related U.S. Application Data

(62) Division of application No. 09/474,361, filed on Dec. 29, 1999, now Pat. No. 6,366,370.

(60) Provisional application No. 60/114,133, filed on Dec. 30, 1998.

(51) Int. Cl.[7] ............................................... G03H 1/26
(52) U.S. Cl. ........................ 359/23; 345/427; 345/620
(58) Field of Search ....................... 359/1, 23; 345/419, 345/427, 620, 418, 433, 435, 440, 420, 424, 345/428; 382/293, 199, 203; 364/522; 358/450; 355/419–424, 427, 428

(56) References Cited

U.S. PATENT DOCUMENTS

| | | | |
|---|---|---|---|
| 3,601,465 A | 8/1971 | Hannan ...................... 350/3.5 |
| 3,657,473 A | 4/1972 | Corcoran ................. 178/6.7 A |
| 3,675,012 A | 7/1972 | Derderian et al. ............ 250/60 |
| 3,697,149 A | 10/1972 | Van Heckeren et al. ..... 350/3.5 |
| 3,832,027 A | 8/1974 | King .......................... 350/3.5 |
| 3,947,640 A | 3/1976 | Ruell et al. ........... 179/100.3 B |
| 4,045,115 A | 8/1977 | Lee ............................. 350/3.5 |
| 4,411,489 A | 10/1983 | McGrew .................... 350/3.76 |
| 4,421,380 A | 12/1983 | McGrew .................... 350/3.78 |
| 4,778,262 A | 10/1988 | Haines ...................... 350/3.66 |
| 4,834,476 A | 5/1989 | Benton ....................... 350/3.76 |
| 4,862,388 A | 8/1989 | Bunker ....................... 345/427 |
| 4,969,700 A | 11/1990 | Haines ...................... 350/3.66 |
| 5,003,497 A * | 3/1991 | Priem ........................ 364/522 |
| 5,194,971 A | 3/1993 | Haines .......................... 359/9 |
| 5,216,528 A | 6/1993 | Honda et al. ................... 359/9 |
| 5,237,433 A | 8/1993 | Haines et al. .................. 359/9 |
| 5,475,511 A | 12/1995 | Haines et al. .................. 359/9 |
| 5,519,517 A | 5/1996 | Redfield et al. .............. 359/22 |
| 5,822,092 A | 10/1998 | Davis ......................... 359/10 |
| 5,843,598 A | 12/1998 | Ueda et al. ................. 430/602 |
| 5,852,504 A | 12/1998 | Kato et al. ..................... 359/9 |
| 5,910,111 A | 6/1999 | Hunziker ................... 600/407 |
| 5,949,430 A * | 9/1999 | Robertson et al. .......... 345/619 |
| 5,999,187 A * | 12/1999 | Dehmlow et al. .......... 345/420 |
| 6,088,140 A | 7/2000 | Klug et al. |
| 6,266,167 B1 | 7/2001 | Klug et al. |
| 6,330,088 B1 | 12/2001 | Klug et al. |

OTHER PUBLICATIONS

Michael W. Halle and Adam B. Kropp, "Fast Computer Graphics Rendering For Full Parallax Spatial Displays," Feb. 1997, pp. 105-112.

(Continued)

Primary Examiner—Leo Boutsikaris
(74) Attorney, Agent, or Firm—Campbell Stephenson Ascolese LLP

(57) ABSTRACT

A method of rendering image data for full parallax autostereoscopic displays. The method is based on a double frustrum camera technique, where two cameras provide image data from opposing sides of an image plane. The near clipping plane is located on the image plane. The distance between the near clipping plane and the eyepoint of the camera frustra is adjusted to minimize or avoid clipping.

11 Claims, 14 Drawing Sheets

OTHER PUBLICATIONS

Copending U.S. Appl. No. 09/019,449 entitled "Segmented Display For Large, Continuous Autostereoscopic Images".

Copending U.S. Appl. No. 09/098,581 entitled Method And Apparatus For Recording One-Step, Full-Color, Full-Parallax, Holographic Stereograms.

Copending U.S. Appl. No. 09/151,330 entitled "System And Method For Hologram Illumination", filed Sep. 11, 1998.

Copending U.S. Appl. No. 09/195,137 entitled "Method And Apparatus For Replicating A Hologram Using A Steerable Beam".

* cited by examiner

FIG. 13a    COARSE POLYGON INTERPOLATION
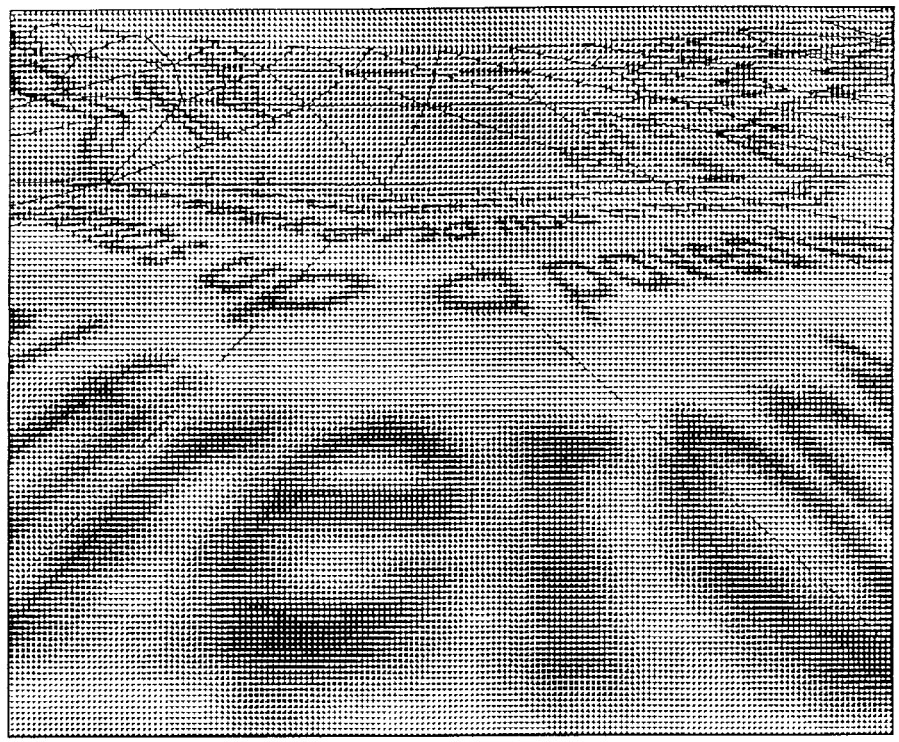
FIG. 13b    FINE POLYGON INTERPOLATION
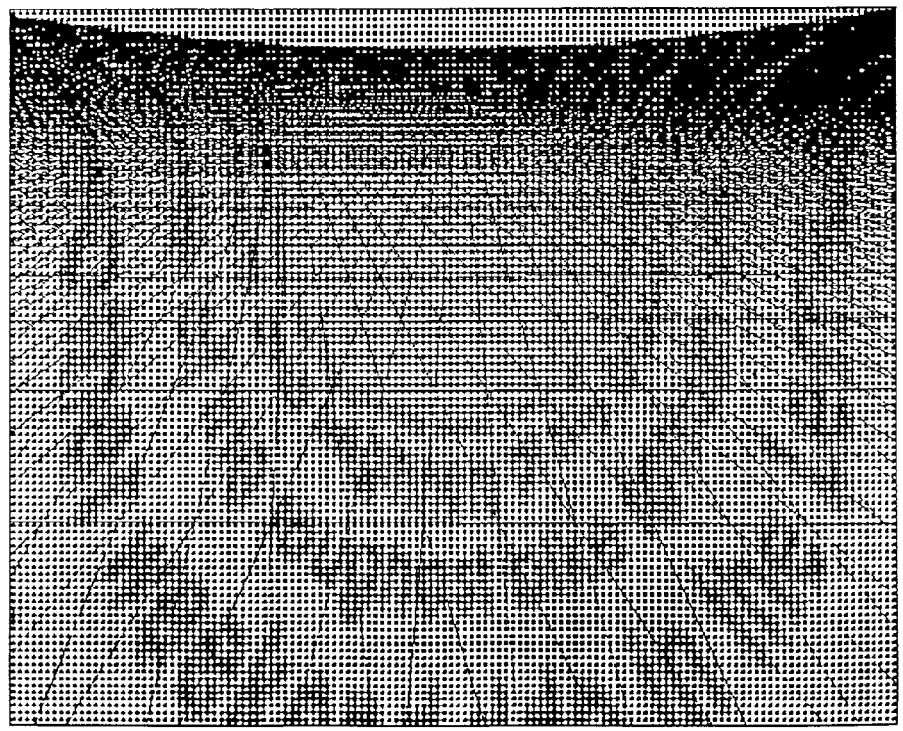

RENDERING METHODS FOR FULL PARALLAX AUTOSTEREOSCOPIC DISPLAYS

RELATED PATENT APPLICATION

This application is a division of application Ser. No. 09/474,361, filed Dec. 29, 1999, now U.S. Pat No. 6,366,370 which claims the benefit of U.S. Provisional Application No. 60/114,133, filed Dec. 30, 1998 and entitled "RENDERING METHODS FOR FULL PARALLAX SPATIAL DISPLAYS".

TECHNICAL FIELD OF INVENTION

This invention relates to imaging processing, and more particularly to methods for producing full parallax autosteereoscopic displays, such as full parallax holograms.

BACKGROUND

In recent years, there has been rapid improvement in graphics display techniques aimed at providing a perception of three dimensions. Three dimensional images displayed on a two-dimensional screen using conventional display technology contain limited three dimensional cues such as obscuration, depth effect, and illumination effects. For enhanced three dimensional displays, special architectures depart from conventional two dimensional displays.

Two enhancements for three dimensional displays are stereopsis and parallax. Stereopsis may be achieved with various hardware such as shutters and headgear. It may also be achieved without special equipment, and the resulting displays are then referred to as "autostereoscopic displays". When parallax is provided in the vertical as well as the horizontal dimensional, the display is referred to as a "full parallax" autostereoscopic display. Full parallax autostereoscopic displays include autostereoscopic displays such as full-parallax holographic stereograms, full-parallax lenticular or "fly's eye" displays, and full-parallax raster-barrier or parallax-barrier displays.

Methods for producing full parallax spatial displays require unconventional computer graphic rendering methods, such as the double frustum rendering method. This method uses two opposing camera frusta, one at either side of the image plane. An implementation of the double frustum method was developed by Michael Halle and Adam Kropp, and is described in the technical paper, "Fast Computer Graphics Rendering for Full Parallax Spatial Displays," Proc. Soc. Photo-Opt. Instrum. Eng. (SPIE), 3011: 105–112 (Feb. 10–11, 1997).

SUMMARY OF THE INVENTION

One aspect of the invention is a computer-implemented method of rendering data for producing a full parallax autostereoscopic display of a digital scene. First, an image plane is defined, the image plane passing through at least a portion of the scene. The image plane is divided into a plurality of contiguous image elements. Two camera frustra are simulated, one on each side of the image plane. Each camera frustrum has an associated eyepoint. A near clipping plane of the frustra is located on the image plane. For each image element, a distance between the eyepoint and the near clipping plane that would avoid near clipping of the scene is determined. Based on this determination, one or more near clipping plane distances are selected, and the camera frustra are positioned along the z axis of the image plane in accordance with the selected near clipping plane distance(s). For each of the image elements, image data is generated from each camera. This image data is combined to render the scene.

The method is especially useful for constructing holograms. Distortion caused by the near clipping plane is greatly reduced, and hence overall image quality is improved.

BRIEF DESCRIPTION OF THE DRAWINGS

FIG. 13A illustrates a rendering of reflective polygons close to the image plane.

FIG. 13B illustrates a rendering of reflective polygons close to the image plane, but with smaller polygons than those of FIG. 13A.

DETAILED DESCRIPTION OF THE INVENTION

The methods described herein are directed to rendering methods for full-parallax autostereoscopic displays. For purposes of example, the following discussion is in terms of one-step holographic stereograms ("holograms"). However, the same techniques could be used to render the image data for master-transfer holograms, as well as for other types of full parallax autostereoscopic displays.

In general, as explained below, the rendering process involves moving two cameras (a conjugate pair) over an image plane comprised of a grid of image elements. The data is processed in a manner appropriate for the type of display.

Once the image data is rendered, the particular type of display may dictate subsequent steps involved in creating the actual display.

Hologram construction methods can be two-step (master-transfer) or one-step. In the master-transfer method, a master hologram is made, then used as an object recorded in a second hologram. More specifically, to make the master, the camera is positioned at a view zone distance from the image plane. The camera captures image data once for every element of the image plane. Then, the master is projected to the view zone. The one-step method eliminates the need for the master by locating apertures on the hologram plane.

The Halle and Kropp paper referenced in the Background describes methods for improving full parallax displays. Included is a description of a conjugate-pair camera (double-frustrum) rendering method and related enhancements of that method.

The double-frustrum rendering method suffers from a noticeable problem with model clipping which can result in abruptly disappearing polygon fragments. There can also be a noticeable problem with environmental reflection mapping artifacts due to interpolation inaccuracies. Both problems have solutions, which are described below.

Model Clipping Problem

The double-frustrum rendering method uses two opposite-facing computer graphic camera frusta. One camera is called the "real" or conventional camera which is forward-facing and which renders model polygons behind the hologram surface. Another camera is called the "conjugate" or rear-facing camera which renders model polygons in front of the hologram surface. According to the Halle/Kropp method, both frusta have a mutual near clipping plane coincident with the hologram plane.

There is a problem, however, when model polygons pass through the near clipping plane and are clipped, because this clipping results in holographic elements or hogels in which a foreground polygon fragment is missing over some portion of the hogel. This results in a flickering or winking disappearance of a foreground polygon fragment depending on viewing position.

Figure 1A:
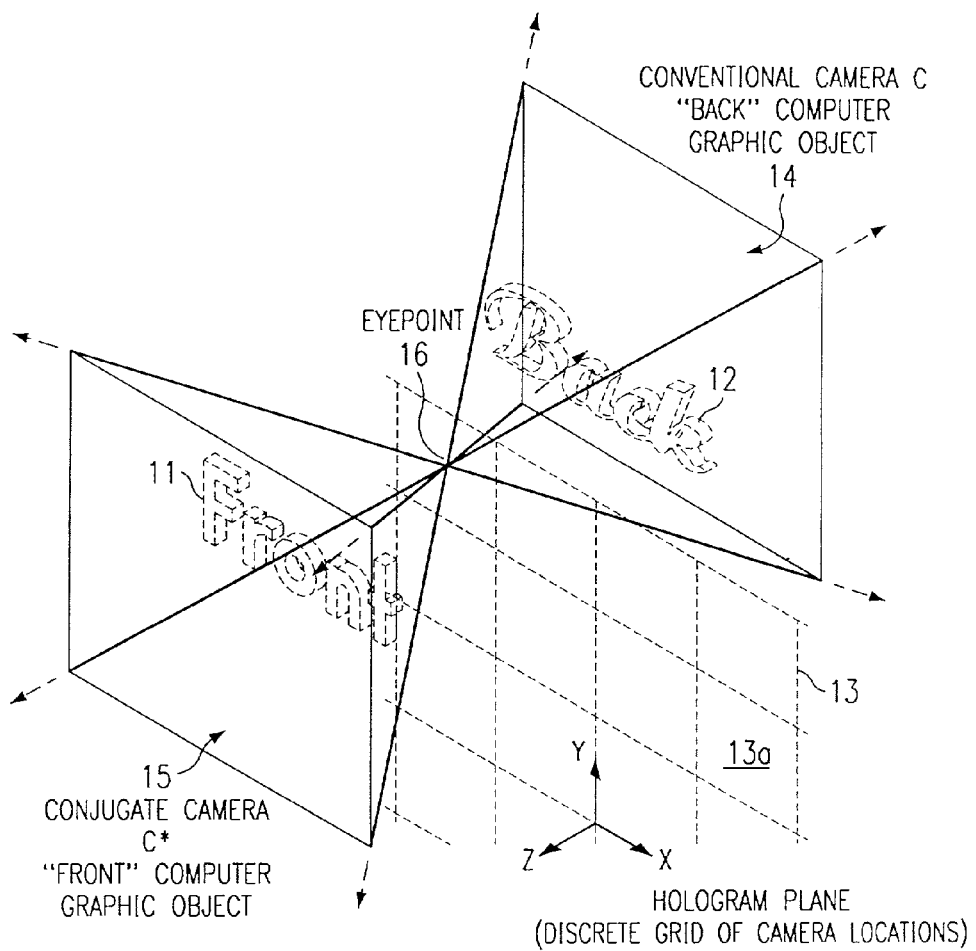
FIGS. 1A and 1B are a perspective view and a side view, respectively, of an ideal camera geometry for double-frustum rendering.
Figure 1B:
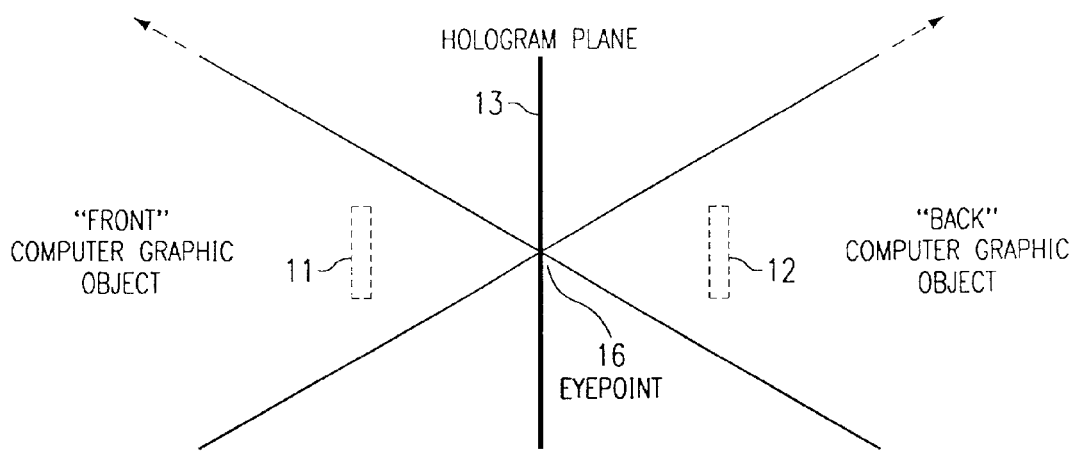

FIGS. 1A and 1B are a perspective view and a side view, respectively, of an ideal camera geometry for double-frustum rendering. This ideal geometry has no near clipping plane. Unfortunately, it is difficult to write a computer algorithm that can render without using a near clipping plane due to a mathematical singularity (division by zero) that would occur in such a case.

In FIGS. 1A and 1B as well as in the following figures, three-dimensional computer graphic objects 11 and 12, shaped like the words "front" and "back", respectively, are shown. These computer graphic objects 11 and 12 are example of a "digital scene" that would be rendered in front and in back of the hologram plane 13.

As is known in the art of computer graphics, the cameras are simulated by the computer rendering process. The conjugate-pair is comprised of a conventional camera 14 and a conjugate camera 15 positioned on opposing sides of the hologram plane 13. Each camera 14 and 15 has an associated eyepoint 16. In the ideal geometry, the eyepoint 16 is located at the hologram plane 13.

The hologram plane 13 is a discrete grid of holographic elements (hogels) 13a, each representing a different camera location. During the rendering process, the cameras move together in a boustrophedon pattern (alternate rows in opposite directions, like that of a raster scan) so that data is acquired from each hogel 13a. As illustrated, the hologram plane 13 and the cameras 14 and 15 can be oriented with respect to a three-dimensional x-y-z plane.

As stated above, the description herein is in terms of constructing holograms. When the display is to be other than a hologram, the hologram plane 13 and the hogels 13a might alternatively be referred to as the image plane and the image plane elements.

Figure 2A:
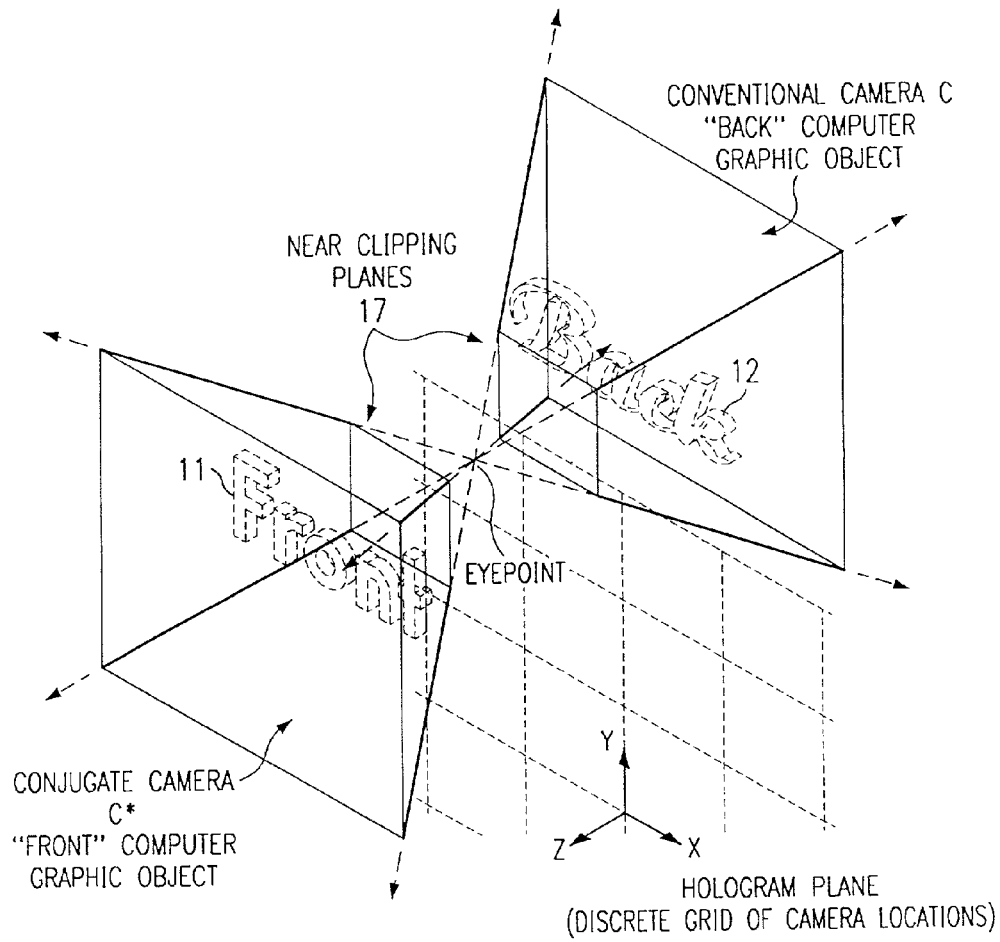
FIGS. 2A and 2B illustrate the camera geometry of FIGS. 1A and 1B, with the addition of a near clipping plane.
Figure 2B:
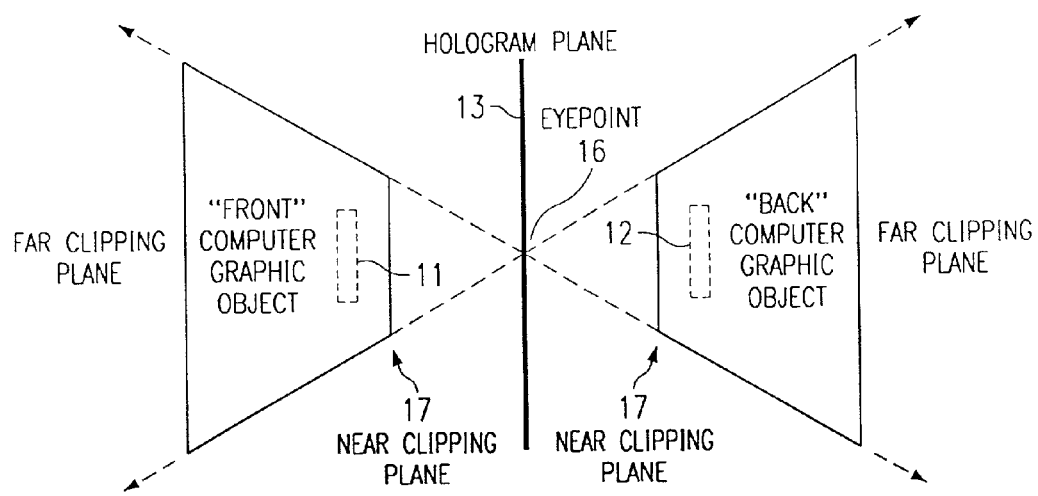

When near clipping planes 17 are added, as shown in FIGS. 2A and 2B, the result is a rendering gap about the hologram plane 13. If there are no computer model pieces in the gap, there will be no noticeable geometrical problems. However, if there are computer model pieces in the gap, they will not be rendered and would seem to disappear in the hologram made this way.

Figure 3A:
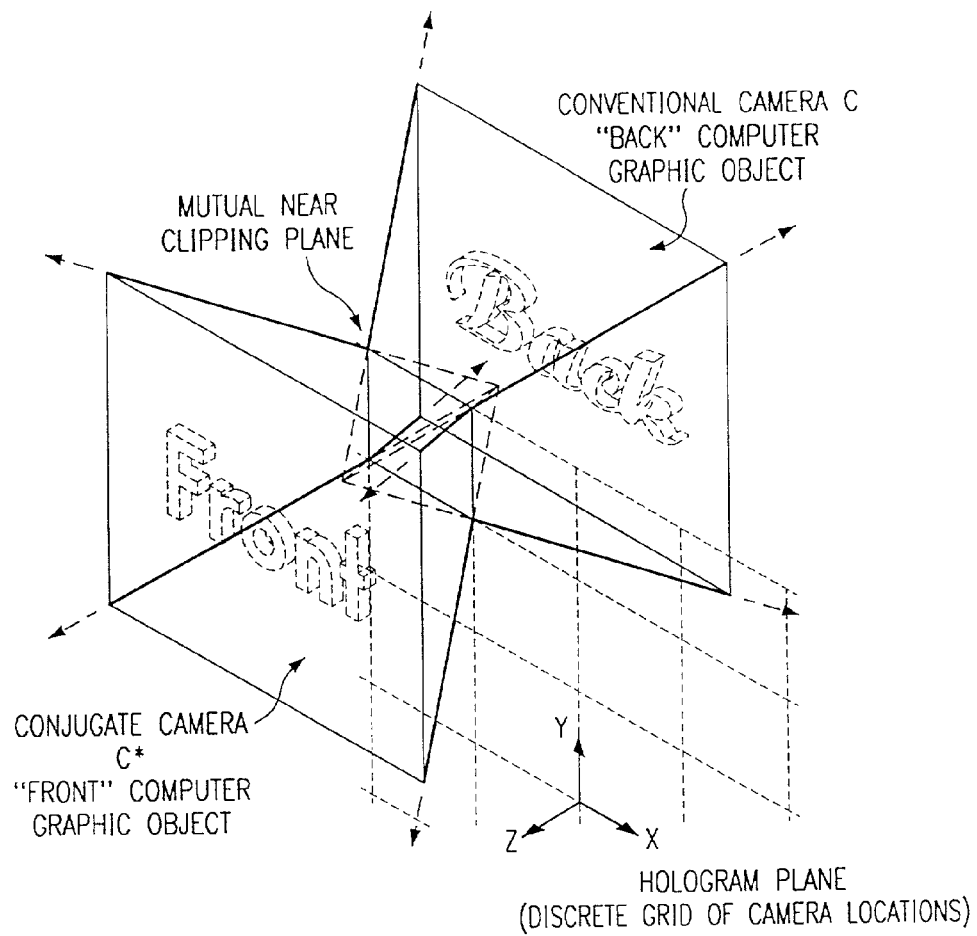
FIGS. 3A and 3B illustrate the camera geometry of FIGS. 2A and 2B, with the cameras translated along the z-axis to place the near clipping plane on the image plane.
Figure 3B:
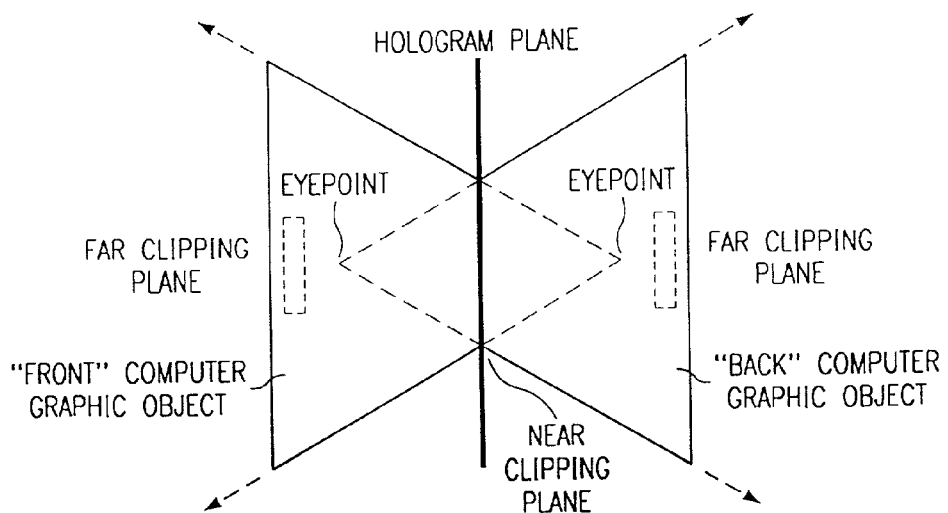

FIGS. 3A and 3B shows the cameras 14 and 15 translated along the z-axis toward the hologram plane 13. The translation is a distance such that the near clipping planes 17 coincide with the hologram plane 13.

Figure 4:
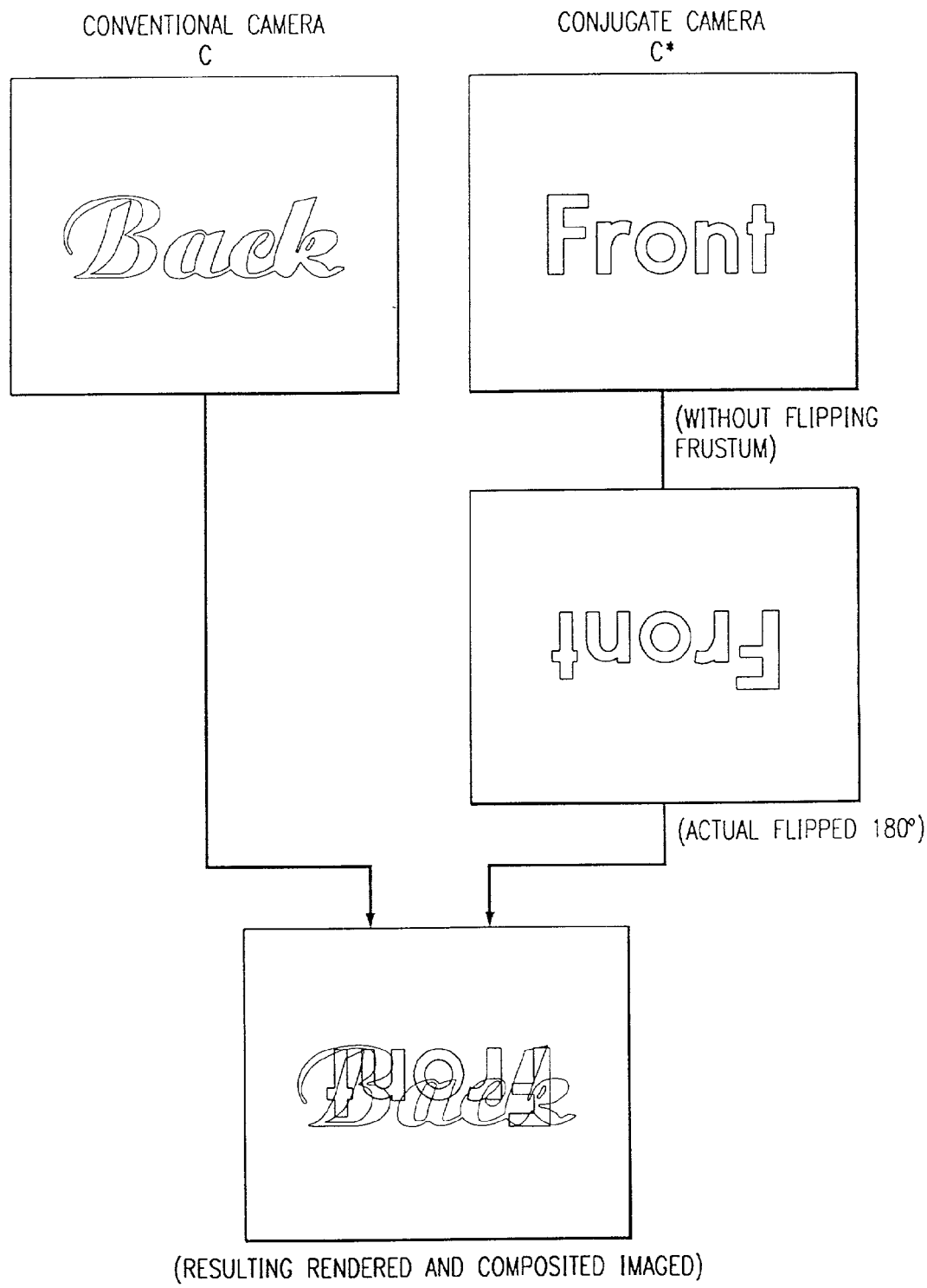
FIG. 4 illustrates an example rendering of the system of FIGS. 3A and 3B.

FIG. 4 illustrates an example rendering of the system of FIGS. 3A and 3B. If there are no computer model pieces that go through the clipping plane 17, such as the ones illustrated, there will be no noticeable geometrical problems. However, if there are computer model pieces that go through the clipping plane, there will be noticeable geometrical problems as described below.

Figure 5A:
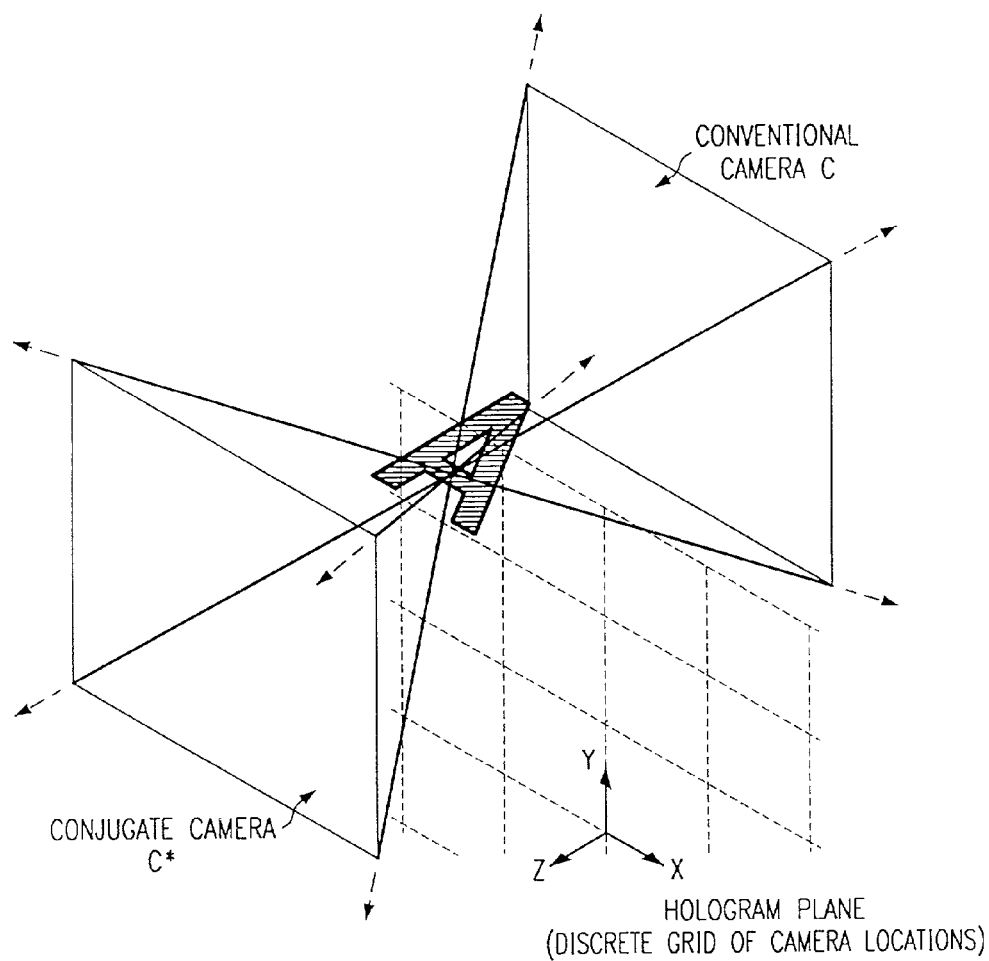
FIGS. 5A and 5B illustrate the camera geometry of FIGS. 1A and 1B, with an object that passes through the eyepoint.
Figure 5B:
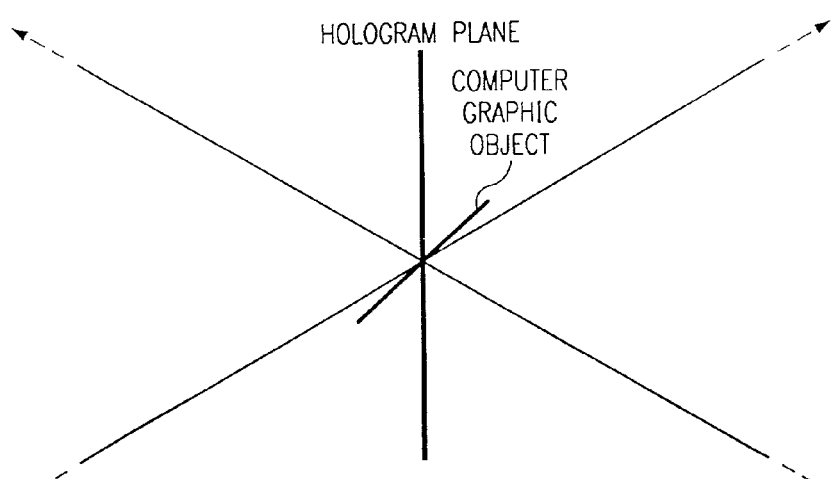

FIGS. 5A and 5B again show a system with the ideal double-frustrum camera geometry (no near clipping plane). The model, the letter A, passes through the eyepoint 16 on the hologram plane 13. If this could be correctly rendered, it would result in an image solidly filled in by the tiny piece of the letter A which passes through the eyepoint 16 with no empty space.

Figure 6A:
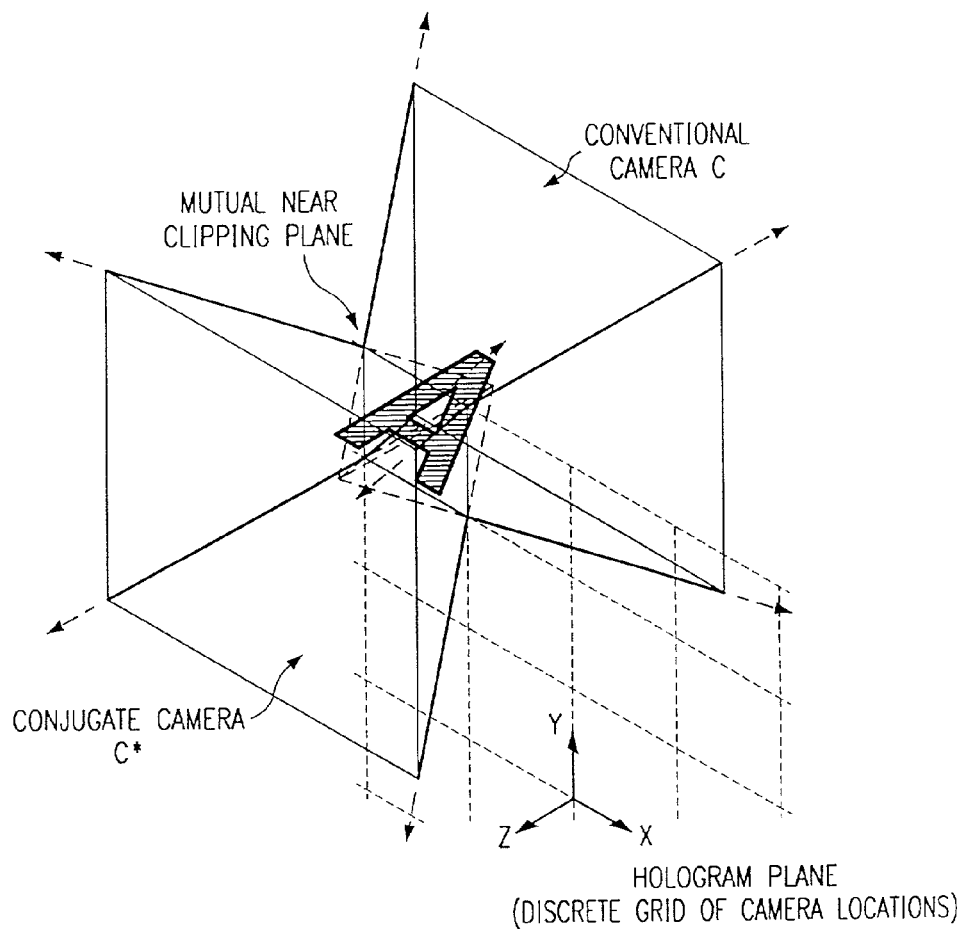
FIGS. 6A and 6B illustrate the camera geometry of FIGS. 3A and 3B, with an object that passes through the eyepoint.
Figure 6B:
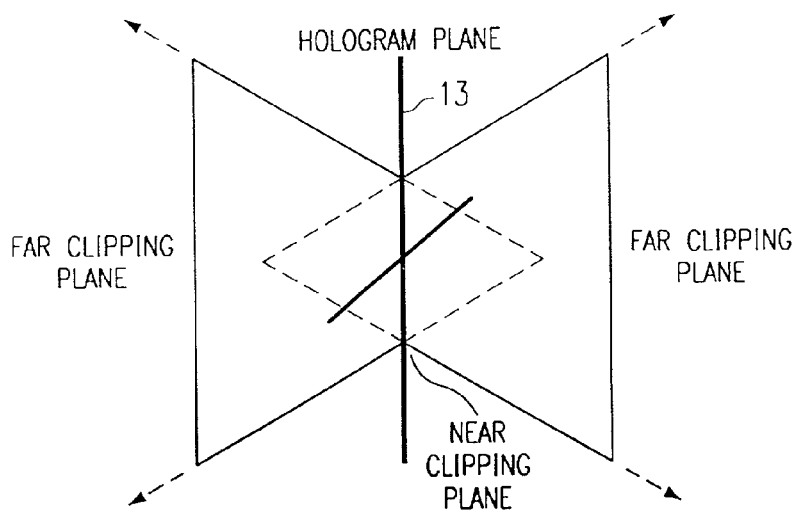

FIGS. 6A and 6B show the same system as FIGS. 3A and 3B, with the cameras 14 and 15 translated along the z-axis so that the near clipping planes 17 coincide with the hologram plane. The model of the letter A passes through the hologram plane 13, and it intersects the mutual clipping-plane area.

Figure 7:
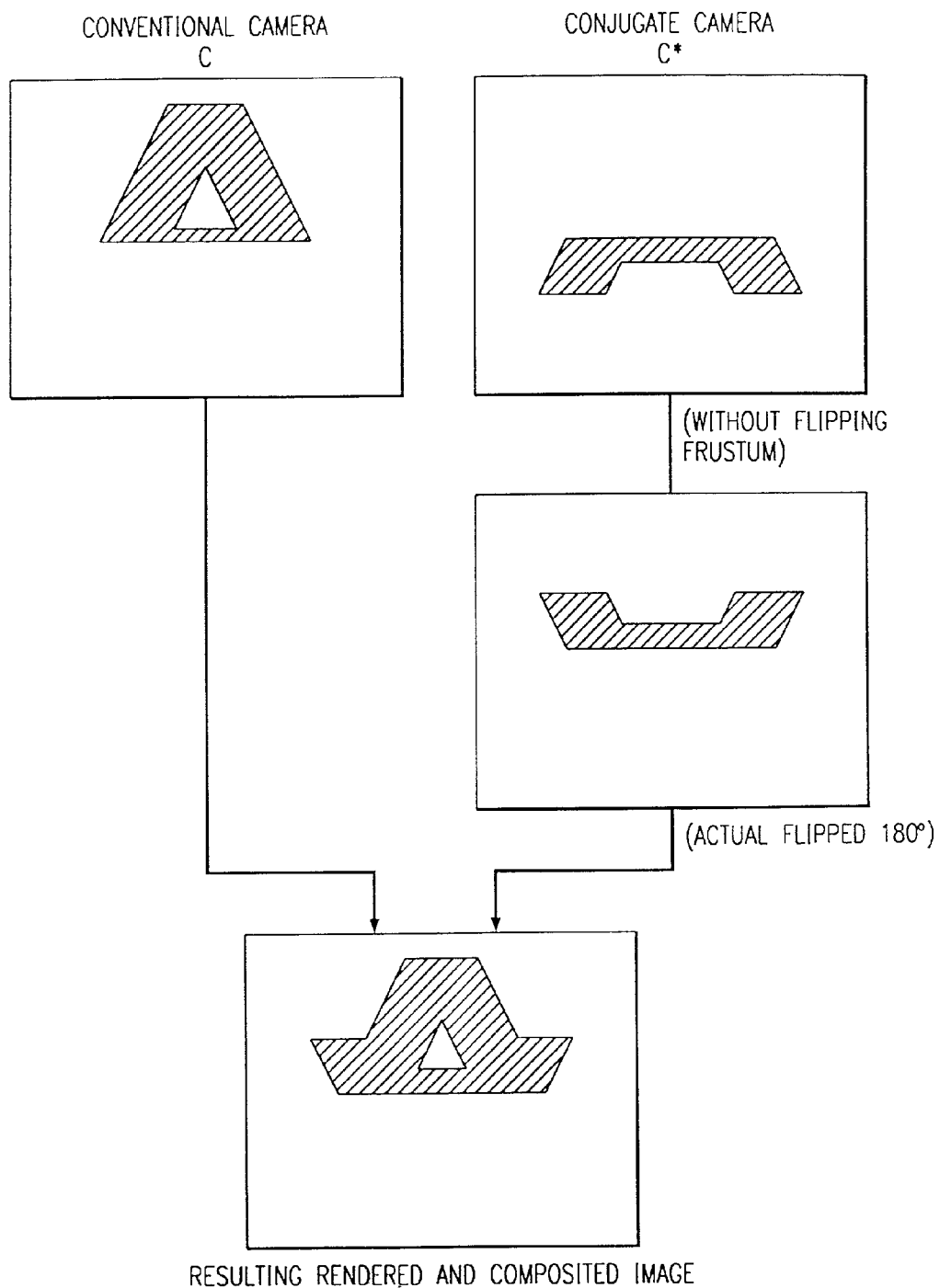
FIG. 7 illustrates an example rendering of the system of FIGS. 5A and 5B.

FIG. 7 illustrates the rendering that would result from the system of FIGS. 6A and 6B. The rendering differs significantly from the ideal case in that the whole letter A is visible instead of just a tiny piece, and the letter seems folded back in on itself because of the vertical flipping of the conjugate camera 15. The bottom portion of the rendered image is completely empty, which would result in the printing of a holographic element 13a that would incorrectly seem empty over half of its viewing angle. Open areas, such as those at the bottom portion of the rendering, cause flickering hogels.

Figure 8A:
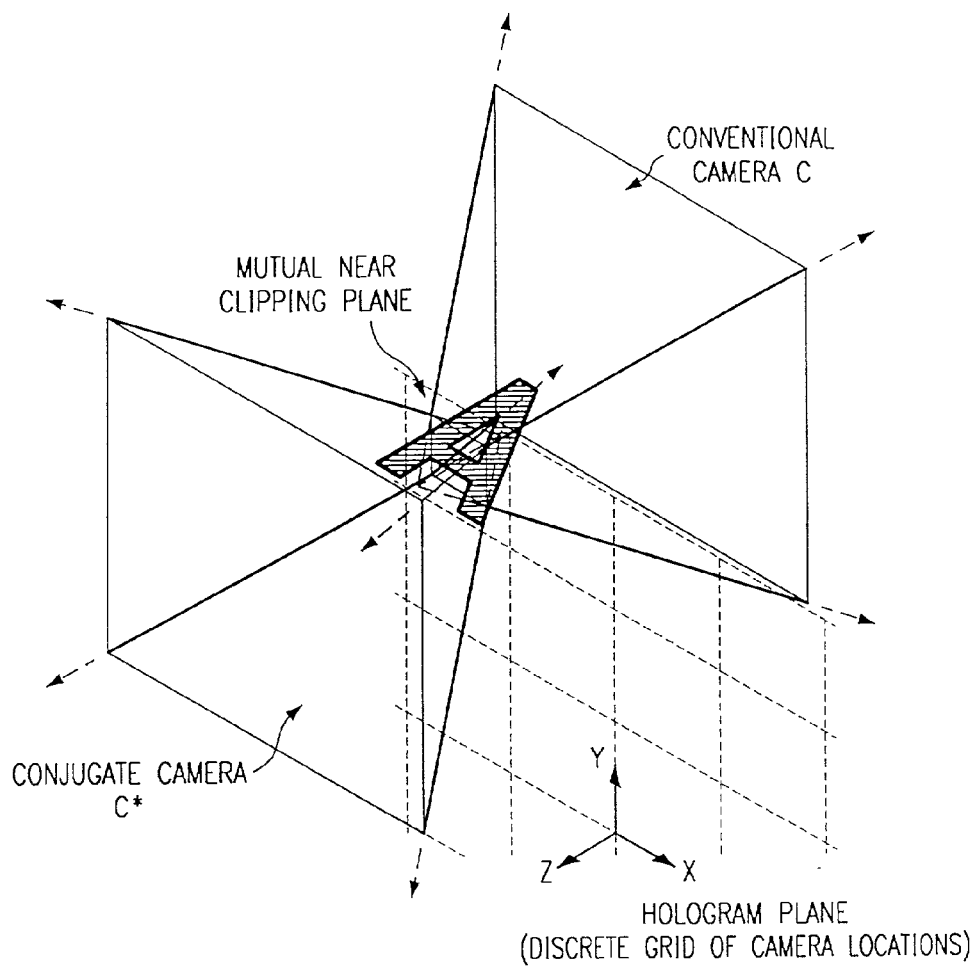
FIGS. 8A and 8B illustrate the camera geometry of FIGS. 3A and 3B, with an object that passes through the eyepoint, but modified such that the eyepoints are moved along the z-axis.
Figure 8B:
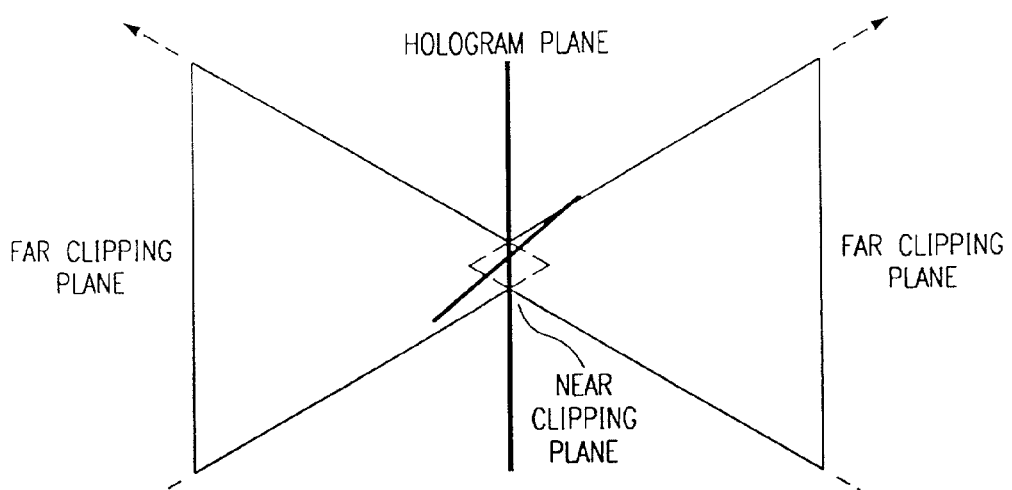

FIGS. 8A and 8B illustrate a modified version of the system of FIGS. 6A and 6B. The system of FIGS. 8A and 8B differs from that of FIGS. 6A and 6B in that the eyepoints 16 of both cameras 14 and 15 are translated toward the hologram plane along the z-axis. The clipping plane 17 remains on the hologram plane 13 but is smaller. Also, the cameras 14 and 15 are moved slightly down along the y-axis. Now, the letter A no longer intersects the exact middle of the clipping-plane area 17.

Figure 9:
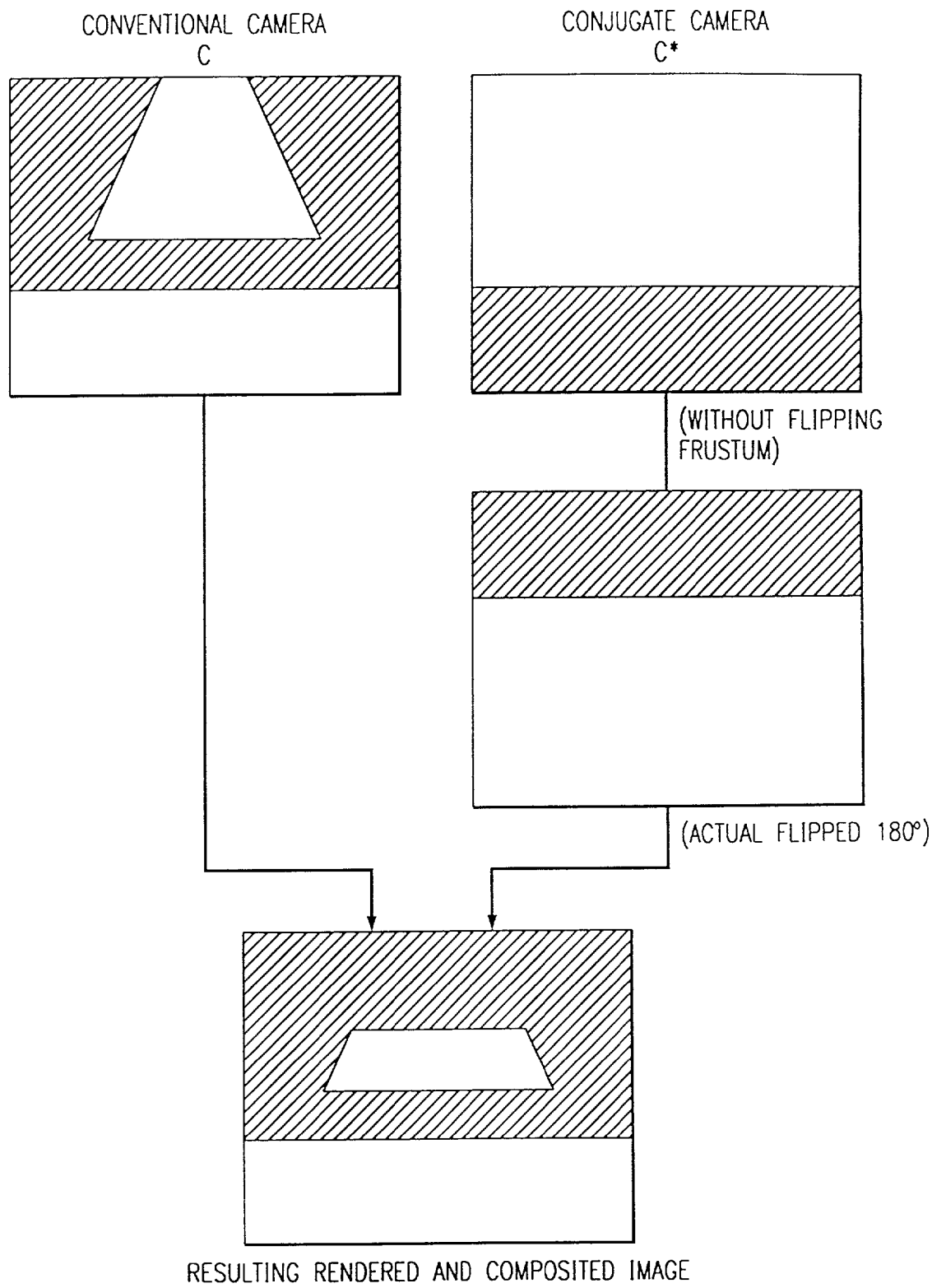
FIG. 9 illustrates an example rendering of the system of FIGS. 8A and 8B.

FIG. 9 illustrates the rendering resulting from the system of FIGS. 8A and 8B. The whole letter A is no longer visible. Approximately the bottom third of the image is now empty, instead of the entire bottom half empty as in FIG. 7.

Figure 10A:
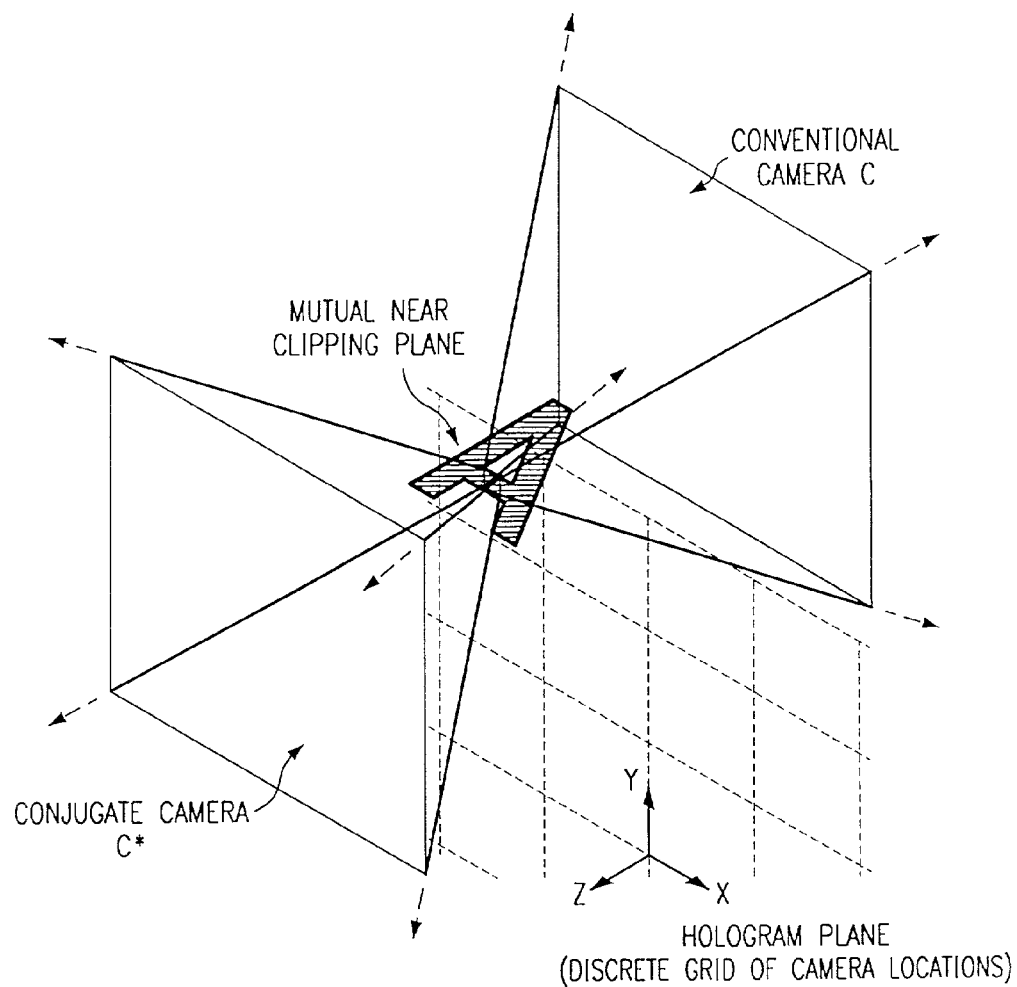
FIGS. 10A and 10B illustrate the camera geometry of FIGS. 9A and 9B, with an object that passes through the eyepoint, but modified such that the eyepoints are moved farther along the z-axis.
Figure 10B:
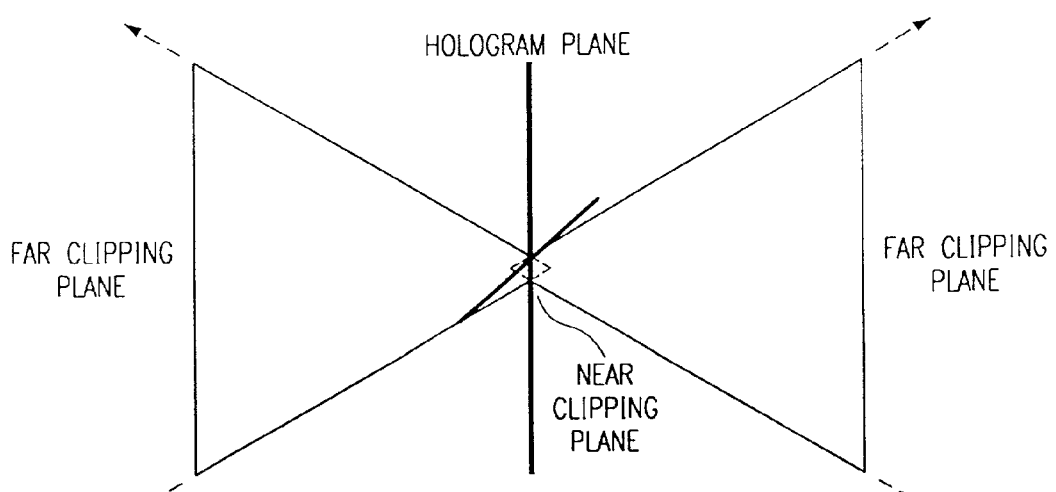

FIGS. 10A and 10B illustrate a system like that of FIGS. 8A and 8B, but with the cameras 14 and 15 translated slightly more along the z-axis. The area of the near-clipping plane 17 is smaller relative to the letter A, and it no longer actually intersects the letter A. This means than there is no clipping of the model by the near clipping plane 17.

Figure 11:
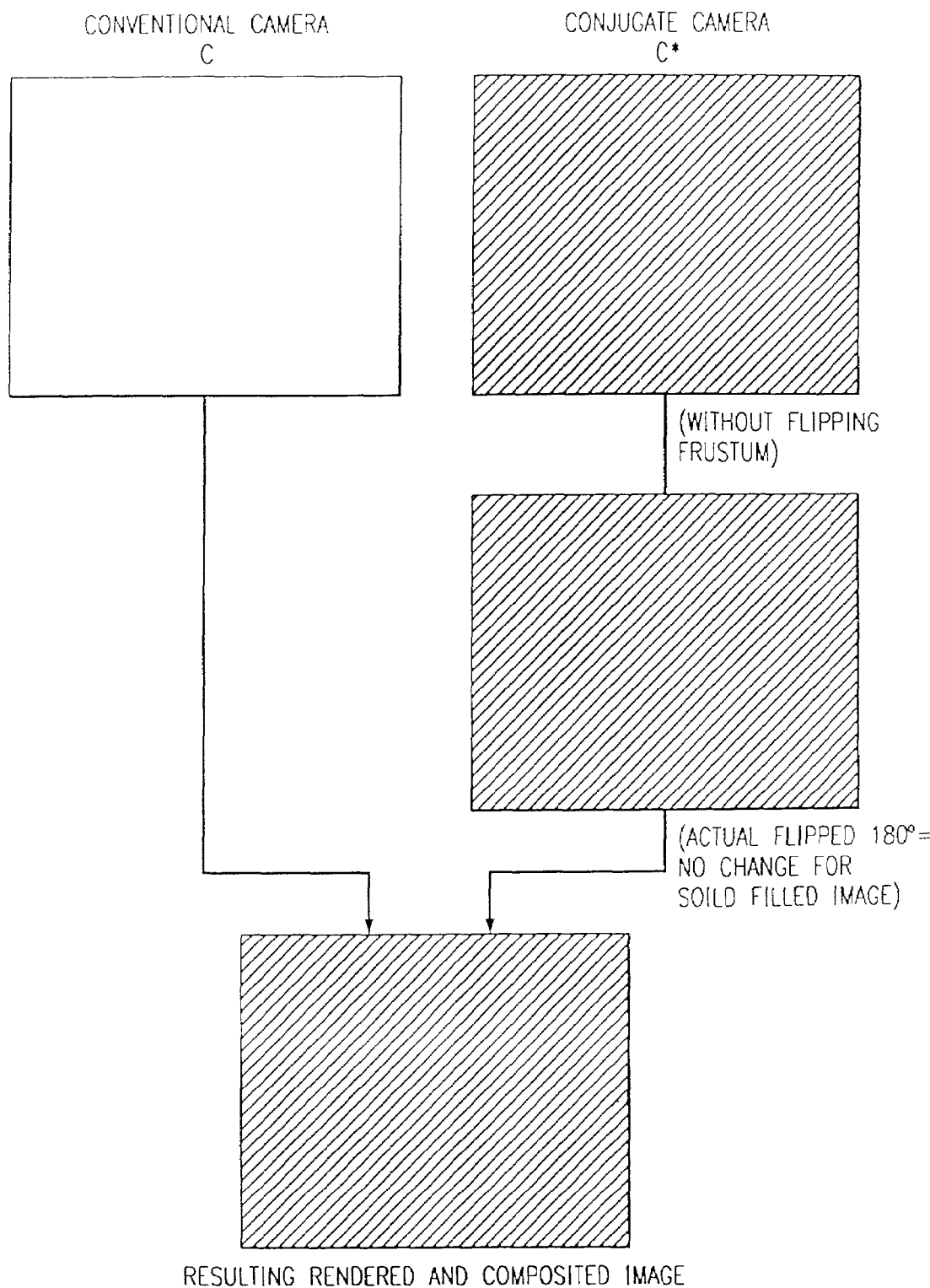
FIG. 11 illustrates an example rendering of the system of FIGS. 10A and 10B.

FIG. 11 illustrates the rendering from the system of FIGS. 10A and 10B. This rendering is what is expected of the ideal case illustrated in FIGS. 5A and 5B. Each of the conjugate camera images is solid (shown as shaded in FIG. 11) as is the composite images.

As illustrated by the above discussion, whenever a polygon is clipped by a near clipping plane, a rendering error inevitably occurs. If the near clipping plane coincides exactly with a mutual edge shared by two polygons on opposite sides of the clipping plane, a rendering error also occurs. This problem is not corrected by pre-clipping the model geometry data—such pre-clipping would have no noticeable effect.

However, a solution can often be found by minimizing the distance between the eyepoint 16 and the near clipping plane 17. The area of the near clipping plane 17 shrinks in size as it nears the eyepoint 16, and so the likelihood increases that there will be no clipping of objects in the scene. This solution is illustrated as the z-shift of the camera eyepoint 16 (and associated frustrum) in FIGS. 10A and 10B.

There is a "degenerate" case where a polygon surface passes exactly through or extremely close to the eyepoint 16. For example, if a polygon surface passes near the eyepoint 16 at an angle almost perpendicular to the near clipping plane, clipping may become unavoidable. A solution in such degenerate cases would be to slightly move the camera eyepoint 16 (and associated frustum) in the xy plane, or even slightly in the z direction if necessary, to the closest point where there is no longer any clipping. Such a movement of the camera eyepoint 16 could be so small relative to the hogel dimensions as to be virtually undetectable by the hologram observer. However, it should be noted that one can construct computer models so densely filled with degenerate cases that they could defy this solution. Another solution for degenerate cases is to render only the clipped polygons with the conjugate camera 15 and without the 180 degree flipping normally done for the conjugate camera 15. This result is composited over the conventional camera image, and the flipped conjugate camera view is composited on top.

Figure 12:
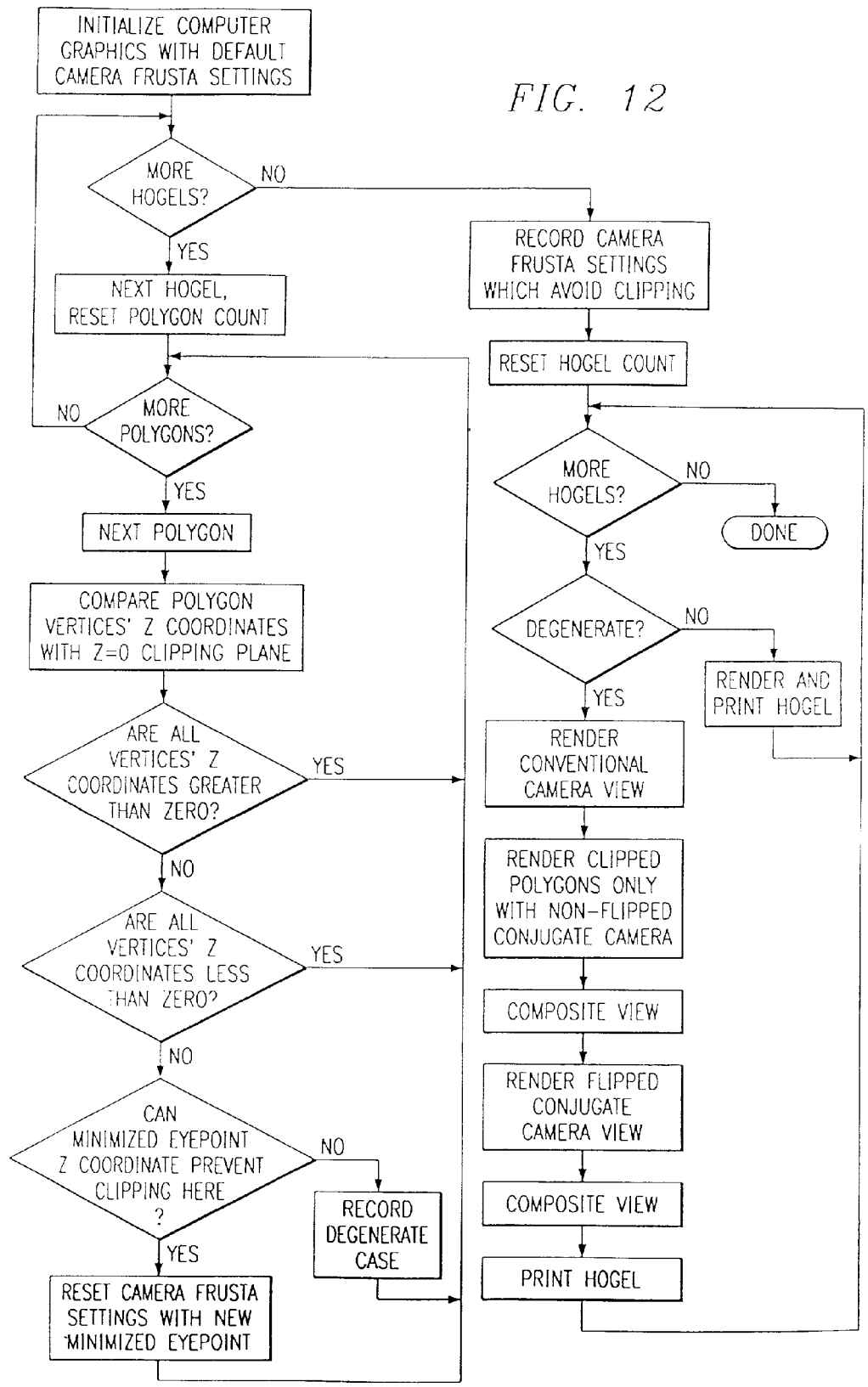
FIG. 12 illustrates the steps of a method for eliminating near clipping plane distortion.

FIG. 12 illustrates a general method of solving the near clipping problem. First analyze the computer model data to check for hogels in which near-plane clipping occurs. For each of these near-clipping hogels, determine the distance between the camera frusta eyepoints and near clipping plane that would avoid polygon clipping entirely. If such a determination is not possible for any of these hogels, they are treated as degenerate. Take the minimum of the near-clipping distances, and use it for the near-clipping plane distance. This will avoid near-plane clipping for all but the degenerate hogels (if any exist).

For degenerate hogels, a separate rendering step is added for near-plane clipped polygons. A conjugate camera rendering of the near-plane clipped polygons only is composited over the conventional camera rendering, without the usual 180 degree flipping of the conjugate image. A 180 degree flipped conjugate camera view of the scene is then be composited on top.

The result is image data representing the scene, which may then be used to generate holograms or some other type of full parallax autostereoscopic display. The scene is then rendered by processing the data acquired from each element, including combining the images from the two cameras.

Although the above-described method uses the same near-clipping plane distance for each hogel 13a of the hologram plane 13, other solutions could be conceived in which the near clipping may vary from hogel to hogel. For example, the distance could be shortened for only those hogels 13a for which near-clipping plane distortion is a problem. Furthermore, the clipping plane adjustment could be greater for some hogels 13a than for others.

For some images, shifting of the near clipping plane distance as described above may result in a less satisfactory image in terms of depth resolution. The method of FIG. 12 could be modified to include various optimization or heuristic techniques to balance good depth resolution with elimination of near clipping plane artifacts. For example, where depth resolution is of high priority, an alternative solution to the near clipping plane problem, such as multi-sampling of hogels or interpolation of neighboring hogels could be used.

Environmental Reflection Mapping; Interpolation Artifacts

Environmental reflection mapping or "environmental mapping" is a popular conventional computer graphic rendering technique. It is used to simulate the appearance of models that are reflective.

Colors on model surfaces seem to be those reflected to the eye from the surrounding environment. For example, if the model is a shiny chrome teapot, the environmental reflection mapping technique allows us to apply the reflected appearance of other parts of a room, such as windows, floor, ceiling, and so on. The way this is done is to make an approximation based on a two-dimensional texture of the environment that is to be mapped on to the model polygons, based on the polygon surface normal vector directions.

A method of environmental mapping is described in Chapter 9 of the *OpenGL Programming Guide*, by the OpenGL Architecture Review Board: Mason Woo, Jackie Neider, and Tom Davis, published by Addison Wesley Developers Press, 1997.

For environmental mapping, the environmental texture coordinates at each polygon vertex are determined. Then, the texture mapped on the surface of each polygon is based on a linear interpolation of the texture coordinates.

As illustrated in FIG. 13A, when the polygons are near to the hologram plane, they may seem large and coarse and the linear reflection map interpolation can result in unacceptably inaccurate reflections.

FIG. 13B illustrates a rendering of the same surface model as that of FIG. 13A, but with smaller polygon facets. Comparison of the two figures evidences the greater inaccuracy of the FIG. 13A. The polygons are triangles in the example of FIGS. 13A and 13B. At each vertex of a triangle, the rendering is accurate, but the interpolation between the vertices results in inaccuracies.

The inaccuracy of graphics rendering reflections is even more evident when a hologram is made of a model with large-seeming polygons near the hologram plane. The linear interpolation of reflections in neighboring hogels on surface elements near the hologram plane manifests itself as scallop-shape ragged edge reflections. The problem is especially noticeable because it is worst near the hologram plane, which is where a viewer's attention is naturally drawn.

Figure 14A:
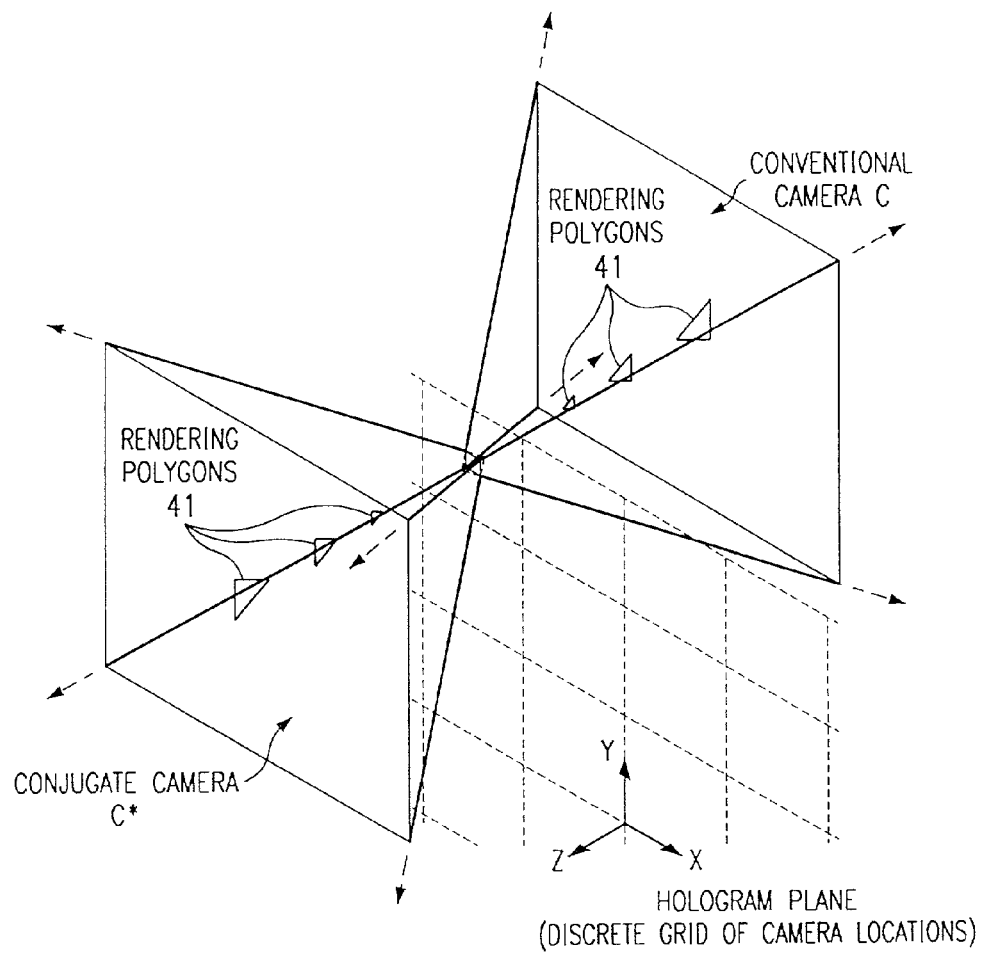
FIGS. 14A and 14B are a perspective view and a side view, respectively, of the double frustrum rendering method applied to a scene with reflective polygons.
Figure 14B:
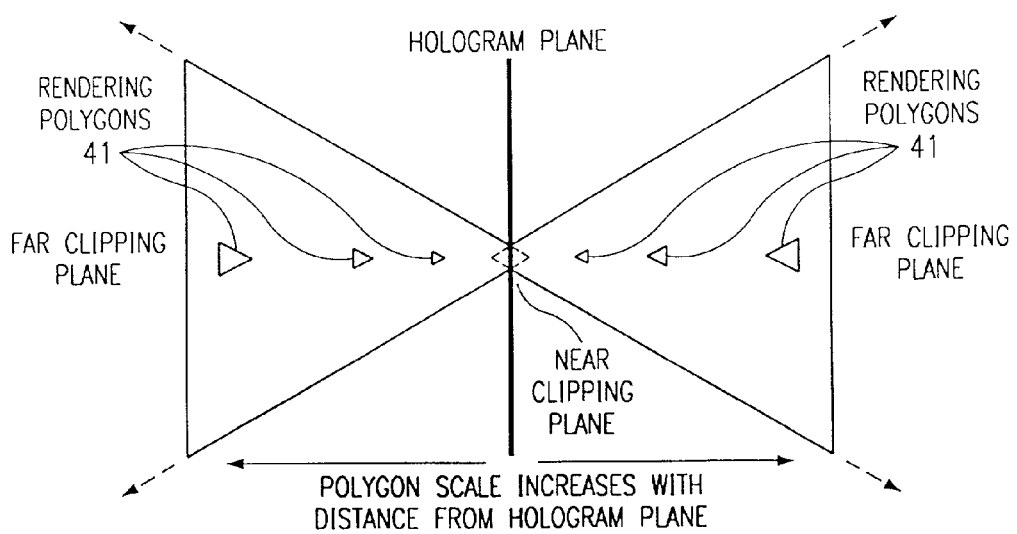

FIGS. 14A and 14B are a perspective view and a side view, respectively, of the double frustrum rendering method applied to a scene with reflective polygons 141. As illustrated, one solution is to break polygons near the hologram plane into a size that is small relative to the XY plane cross section dimensions of the camera frustum at the distance they appear relative to the eyepoint 16. Polygons 141 near the eyepoint 16 typically must be broken down (or subdivided) more than polygons 141 far from the eyepoint 16.

For example, where the polygons 141 are triangles, a triangle can easily be broken down by creating a new vertex at the center of a triangle by linearly interpolating (averaging) the three original triangle vertices), then creating new edges between the new center vertex and the original three vertices, thus breaking the single triangle into three new triangles. The new center vertex need not necessarily lie on the surface of the original triangle. It could be displaced off the surface using a more complicated interpolation method of second, third, or higher order that may take other surrounding surface points into account.

If a triangle near the near clipping plane 17 has edge dimensions that are at least 10 times smaller than the dimensions of the near clipping plane 17, the environmental mapping interpolation artifacts will not be very noticeable. For example, the ratio between the largest side of the triangle and the largest edge of the proximate near clipping plane could be maintained at a constant ratio of 1:10.

Thus, in general, the solution to the environmental mapping problem is to vary the size of the rendering polygons 141 in accordance with the distance to the near clipping plane 17. As this distance decreases, the size of the polygons 141 decreases. For example, the ratio of the polygon dimensions to the dimensions of an xy plan area dimensions bounded by the camera frusta near or intersecting the polygon could be maintained at a substantially constant value.

Another possible solution would be to use a more accurate interpolation method such as a higher order polynomial interpolation method in calculating the reflection texture map based on the object's surface curvature.

Other Embodiments

Although the present invention has been described in detail, it should be understood that various changes, substitutions and alterations can be made hereto without departing from the spirit and scope of the invention as defined by the appended claims.

What is claimed is:

1. A computer-implemented method of rendering data for producing a full parallax autostereoscopic display of a digital scene, comprising the steps of:
    defining an image plane that passes through at least a portion of said scene;
    dividing the image plane into a plurality of contiguous image elements;
    simulating two camera frustra on opposing sides of said image plane, each camera frustrum having an associated eyepoint;
    defining a near clipping plane of said frustra on said image plane;
    for each image element, determining a distance between said eyepoint and said near clipping plane that would avoid near clipping of said scene, thereby determining a set of near clipping plane distances;
    positioning said camera frustra along a z axis in accordance with one or more of said near clipping plane distances;
    generating, for each of said elements, image data for each of said cameras; and
    combining said image data, thereby rendering said scene.

2. The method of claim 1, wherein the method is performed to produce holograms, and wherein said generating step provides holographic image data.

3. The method of claim 1, wherein said positioning step provides a single near clipping plane distance for all of said elements.

4. The method of claim 1, wherein said positioning step provides near clipping plane distances within a predetermined range.

5. The method of claim 1, further comprising the step of identifying degenerate elements for which said determining step will not result in avoiding clipping.

6. The method of claim 5, wherein the method is performed to produce a hologram, and further comprising the step of rendering image data for said degenerate elements by special compositing of images from said camera frustra.

7. The method of claim 5, further comprising the step of rendering image data for said degenerate elements by repositioning said camera frustra in a direction parallel to said image plane.

8. The method of claim 1, wherein said scene is comprised of polygons, and said determining step compares z vertices of said polygons with a z distance of said clipping plane.

9. The method of claim 1, further comprising the step of evaluating said image data for depth resolution and compensating said image data based on said evaluating step.

10. A full parallax autostereoscopic print of a digital scene, whose image data is rendered according to the following steps:
    defining an image plane that passes through at least a portion of said scene;
    dividing the image plane into a plurality of contiguous image elements;
    simulating two camera frustra on opposing sides of said image plane, each camera frustrum having an associated eyepoint;
    defining a near clipping plane of said frustra on said image plane;
    for each of said contiguous image element, determining a distance between said eyepoint and said near clipping plane that would avoid near clipping of said scene, thereby determining a set of near clipping plane distances;
    positioning said camera frustra along a z axis in accordance with one or more of said near clipping plane distances;
    generating, for each of said contiguous image elements, image data for each of said cameras; and combining said image data, thereby rendering said scene.

11. A computer-readable medium whose contents cause a computer system to render image data for a full parallax autostereoscopic display, by performing the steps of:
    defining an image plane that passes through at least a portion of said scene;
    dividing the image plane into a plurality of contiguous image elements;
    simulating two camera frustra on opposing sides of said image plane, each camera frustrum having an associated eyepoint;
    defining a near clipping plane of said frustra on said image plane;
    for each of said contiguous image element, determining a distance between said eyepoint and said near clipping plane that would avoid near clipping of said scene, thereby determining a set of near clipping plane distances;
    positioning said camera frustra along a z axis in accordance with one or more of said near clipping plane distances;
    generating, for each of said contiguous image elements, image data for each of said cameras; and
    combining said image data, thereby rendering said scene.

* * * * *

UNITED STATES PATENT AND TRADEMARK OFFICE
CERTIFICATE OF CORRECTION

PATENT NO. : 6,963,431 B2  Page 1 of 1
APPLICATION NO. : 10/058710
DATED : November 8, 2005
INVENTOR(S) : Holzbach et al.

It is certified that error appears in the above-identified patent and that said Letters Patent is hereby corrected as shown below:

At Column 8 in Claim 10, line 30 after "image", please delete "element" and insert --elements--

Signed and Sealed this

First Day of August, 2006

JON W. DUDAS
*Director of the United States Patent and Trademark Office*